March 24, 1970     K. SCHNEIDER     3,502,982

EXPANDED SCALE ELECTRICAL INDICATING INSTRUMENT

Filed Nov. 13, 1967

INVENTOR.
KURT SCHNEIDER

United States Patent Office 3,502,982
Patented Mar. 24, 1970

3,502,982
EXPANDED SCALE ELECTRICAL INDICATING
INSTRUMENT
Kurt Schneider, 53–56 65th Place,
Maspeth, N.Y. 11378
Filed Nov. 13, 1967, Ser. No. 682,376
Int. Cl. G01r 1/02
U.S. Cl. 324—131                                8 Claims

ABSTRACT OF THE DISCLOSURE

A stable and high efficiency expanded scale voltmeter which employs a bridge circuit having a pair of amplifiers coupled to opposite branches of the bridge, and a pair of voltage reference sources coupled to the alternate opposite branches of the bridge, having their reference outputs coupled to the inputs of said amplifiers. When a potential is applied to a first pair of terminals, and after the voltage reference sources reach conduction, the amplifiers will unsaturate and amplify so that the bridge will become unbalanced and detect further applied potential over a limited range as indicated on a linear meter connected to a second pair of opposite terminals of the bridge.

---

Figure 1:
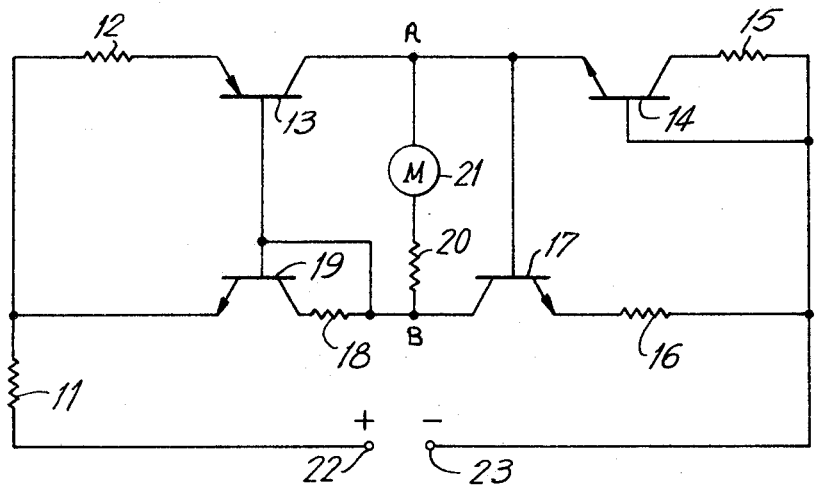

This invention relates to improvements in expanded scale electrical indicating instruments.

More specifically, this invention relates to A.C. or D.C. expanded scale voltmeters which utilize a minimum amount of power for the accurate detection of high and low voltages on expanded scale instruments.

In measuring electrical voltages and currents, conventional meters are arranged to displace an indicator along the scale by an amount which is a function of the value of the quantity to be measured. The meter indicator ordinarily travels from a zero position corresponding to an absence of the quantity to be measured, to a maximum position as the quantity increases. The sensitivity of such a meter is defined in terms of the displacement of its indicator from the zero position for a given value of the quantity being measured.

In many applications, the electrical quantity to be measured does not vary from zero to a maximum but remains restricted between certain finite limits. In such instances, the use of conventional zero to full scale meters to measure the quantity results in a movement of the indicator of the meter over only a small portion of the scale, as the measured quantity varies. Thus the resolution of the meter in measuring the electrical quantity within the range of variation is reduced.

Where the magnitude of the electrical quantity to be measured and its range of variation is restricted within finite limits, the problem of providing a meter having high resolution and low power drain is particularly difficult. Moreover, with alternating current measuring devices, it has been found difficult to maintain accurate and stable measurements over wide ranges of operating temperatures.

Accordingly, the present invention provides an improvement in expanded scale electrical indicating instruments wherein the instruments are capable of operating with no external power source other than the quantity to be measured. Due to the high efficiency of the instrument according to the invention and its measuring circuit, there is very little power drain taken from the applied source after the meter starts to deflect. The instrument according to the invention utilizes a balanced bridge circuit having a plurality of semiconductor devices staged in the branches of the bridge to serve as amplifiers and voltage reference components. A microammeter is connected across the junction between opposite pairs of branches for detecting small changes in voltage of a preset voltage magnitude. In another embodiment of the invention, in place of the transistor voltage reference sources, diodes are utilized in their forward conducting state to provide fixed voltage reference sources for use in detecting low voltages for expanded scale meter readings. The instrument according to the invention uses low cost components together with a conventional meter movement and may be utilized for D.C. or A.C. applications by means of coupling the D.C. portion of the instrument to a full wave bridge rectifier circuit.

It is therefore an object according to the present invention to provide an expanded scale electrical indicating instrument which requires no external power supply and operates efficiency off the applied source potential.

It is another object according to the present invention to provide an expanded scale measuring instrument which provides accurate measurements of A.C. and D.C. voltages over a wide temperature range.

It is stlil a further object according to the present invention to provide an expanded scale instrument which is simple in design, easy to construct, and inexpensive in cost.

Other objects and features of the present invention will become apparent from the following detailed description considered in connection with the accompanying drawings which disclose embodiments of the present invention.

Figure 2:
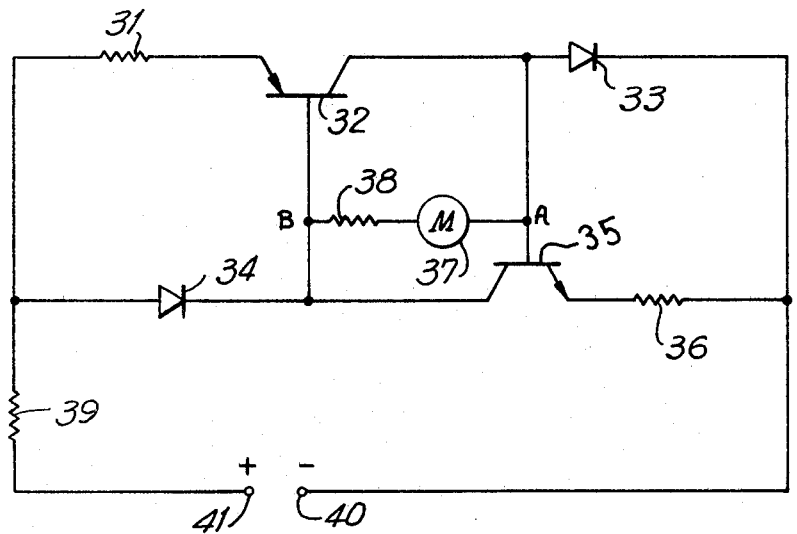

In the drawings:

FIG. 1 is a schematic diagram of one embodiment of an expanded scale instrument according to the invention utilizing a D.C. meter movement; and FIG. 2 is a schematic diagram of another embodiment of an expanded scale instrument circuit for detecting low voltage sources.

Referring to FIG. 1, there is shown a first embodiment of the instrument according to the invention constructed in the form of a voltmeter bridge circuit connected through range resistor 11 to source terminals 22 and 23. The bridge circuit includes resistor 12 connected to the emitter of P.N.P. transistor 13, said transistor having its collector coupled to one input of microammeter 21. The identical meter input is also connected to the emitter of N.P.N. transistor 14 and the base of N.P.N. transistor 17. The base of transistor 14 is connected to the negative terminal of source 23. Transistor 14 has its collector returned through resistor 15 to the same source terminal to complete its D.C. return so that it will serve as a voltage reference source on one branch of the bridge. In a similar manner, N.P.N. transistor 19 connected to the opposite leg serves as a voltage reference source through its connection to positive side 22 of the voltage source. Resistor 18 serves as a D.C. return for the collector of transistor 19. The base of transistor 19 is connected to both the base of transistor 13 and to series resistor 20 on the other input of microammeter 21. Resistor 16 connecting the negative source terminal 23 to the emitter of transistor 17 is similar to that of resistor 12 in maintaining a constant current through the voltage reference source. The base of transistor 17 is connected to one input of meter 21 while its collector is connected to its series resistor 20.

The circuit of FIG. 1 operates as follows:

As the potential applied to terminals 22 and 23 is increased, transistor amplifiers 13 and 17 will conduct until voltage reference transistors 14 and 19 have reached their reverse bias breakdown ($V_{BEO}$) voltage. During the build-up of potential, across terminals 22 and 23, and prior to the breakdown of voltage reference transistors 14 and 19, the polarity across terminal A of meter 21 is positive with respect to the negative terminal B so that the pointer of the meter is held downscale.

When the input potential at 22 and 23 causes transistors 14 and 19 to reach $V_{BEO}$, their breakdown voltage, the voltage across their base-to-emitter terminals stabilizes for further increases in input potential. Thus, the base of transistor 19 will maintain a constant voltage on the base of transistor amplifier 13, and the emitter of transistor 14 will hold the base of transistor amplifier 17 at constant voltage with respect to input terminals 22 and 23. Therefore, any further increase in voltage across input terminals 22 and 23 will cause transistor amplifiers 13 and 17 to become unsaturated and amplify, and provide a very high impedance at their collectors connected to meter 21. The bridge circuit will then have reached a balanced condition and the pointer on meter 21 will indicate zero.

As the applied potential is increased still further, and with amplifiers 13 and 17 unsaturated, the current will pass through the emitter-to-base of source 19 to terminal B of the meter; and from terminal A, through the emitter-to-base of source 14 to terminal 23. With $V_{BEO}$ held constant for transistors 14 and 19, the change in voltage across meter 21 will be linearly proportional to the change in potential across terminals 21 and 22.

Moreover, essentially all of the current drain on the input potential is supplied to linear scale meter 21 and there is little current leakage to the other components. The potential across terminals A and B during the upscale readings on meter 21 will have reversed polarity with respect to its polarity before $V_{BEO}$ has been reached.

The current in meter 21 with respect to the changes in input voltage is limited by series resistor 20. Series resistor 20 may be calibrated to establish the voltage spread through which the expanded scale voltage indications may be read. In a similar manner, resistor 11 connected in series with terminal 22 may be calibrated to establish a first voltage magnitude for which meter 21 will begin to read.

In one construction of the embodiment of FIG. 1, for an expanded scale voltmeter with a range from approximately 20 to 22 volts D.C. at 25° C., the following component values were used:

| Components: | Value |
| --- | --- |
| 11 | 7382 ohms. |
| 12 | 4000 ohms. |
| 13 | 2N3905. |
| 14 | 2N336, $V_{BEO}=4$ v.±10%. |
| 15 | 10K ohms. |
| 16 | 4000 ohms. |
| 17 | 2N3903. |
| 18 | 10K ohms. |
| 19 | 2N336 $V_{BEO}=4$ v.±10%. |
| 20 | 9.4K ohms. |
| 21 | D.C. meter, 100 microamps, 825 ohms, ±20%. |

The following quantities were measured on the circuit construction using the above-described values:

| Input Voltage | VEC (Trans. 13) | $V_{BEO}$ (Trans. 14) | VAB (Meter and R20) |
| --- | --- | --- | --- |
| 17.0 | .010 | 2.80 | −.60 |
| 18.0 | .075 | 3.75 | −.56 |
| 19.0 | .220 | 3.80 | −.40 |
| 19.5 | .375 | 3.82 | −.18 |
| 20.0 | .600 | 3.83 | .00 |
| 20.5 | .820 | 3.84 | +.30 |
| 21.0 | 1.060 | 3.85 | +.55 |

At 20 volts input, voltage reference sources 14 and 19 have become stabilized and meter 21 reverses in polarity to deflect upscale. Amplifiers 13 and 17 become unsaturated and amplify further increases in potential across terminals 22 and 23.

Referring to FIG. 2, there is shown an expanded scale voltmeter circuit similar to that with respect to FIG. 1 for use in providing low voltage expanded scale indications. The circuit includes transistor amplifiers 32 and 35 on opposite branches of the bridge circuit and diodes 33 and 34 coupled to the alternately opposite branches to serve as voltage reference sources in their forward conducting state. Diodes 33 and 34 have been substituted in place of their transistor counterparts of FIG. 1 and are constructed from germanium so that their forward conducting potential is approximately 0.3 volt. Amplifiers 32 and 35 also utilized germanium transistors so that low voltage expanded scale indications may be obtained.

In the construction of an expanded scale meter utilizing the circuit of FIG. 2 and having an expanded scale indication of 0.9 volt to 1.1 volts D.C. at 25° C., the following component values were used:

| Component: | Value |
| --- | --- |
| 31 | 175 ohms. |
| 32 | 2N827 or equivalent. |
| 33 | 1N34. |
| 34 | 1N34. |
| 35 | 2N313 or equivalent. |
| 36 | 175 ohms. |
| 37 | D.C. meter 50 microamps, 1000 ohms, ±20% at 25°. |
| 38 | Approximately 100 ohms. |
| 39 | Approximately 200 ohms. |

The circuit of FIG. 1 utilizes silicon semiconductor components having good temperature stability characteristics over a wide range of operating temperatures. Moreover, since the transistor amplifiers and voltage references are coupled on opposite branches of the bridged circuit respectively, and the components have similar temperature characteristics, temperature changes on the components will cause their values to change in the same direction on opposite branches of the bridge, so that the resultant effect of the temperature change as observed by meter 21 will be negligible. Furthermore, unlike most conventional expanded scale meters, an ordinary linear meter movement may be utilized for reading the expanded scale indications due to the linear relationship between applied voltage and metered voltage.

Although the circuit if FIG. 2 uses germanium components, a balancing due to temperature changes takes place in the bridge circuit in a manner similar to that with respect to the circuit in FIG. 1 so that expanded low voltage readings may be indicated with reasonable stability over broad temperature ranges.

The expanded scale voltmeter circuits of FIGS. 1 and 2 may also be utilized for measurement of AC voltages by coupling inputs 22 and 23, or 41 and 40 to a full wave bridge rectifier circuit as is commonly known in the art.

While only a few embodiments of the present invention have been shown and described, it will be understood that many other changes and modifications may be made therein without departing from the spirit and scope of the invention.

What is claimed is:

1. A low power expanded scale voltmeter circuit having a meter and a bridge-type circuit comprising;
   a pair of transistor amplifiers coupled across opposite branches of the bridge circuit, the input of said amplifiers being coupled to the input of the bridge circuit, and the output of said amplifiers being coupled to said meter,
   a pair of oppositely biased semiconductor voltage reference sources coupled across alternate opposite branches of the bridge circuit, having their inputs coupled to the input of said bridge circuit, and their outputs coupled to the meter, so that when a predetermined applied voltage is coupled to the input of said bridge circuit, and said sources becomes conductive and said amplifiers become operative, the meter is effectively coupled through said sources to the input of the bridge circuit so that the meter will read upscale proportional to the applied voltage.

2. The circuit as recited in claim 1 wherein said semiconductor voltage reference sources are transistors.

3. The circuit as recited in claim 1 additionally comprising a second range resistor connected in series with meter for controlling the deflection of said meter during expanded scale readings.

4. The circuit as recited in claim 3 additionally comprising a second range resistor connected in series with said input terminals for determining the first voltage to be detected on said meter.

5. The circuit as recited in claim 4 wherein said voltage sources and amplifier transistors are silicon.

6. The circuit as recited in claim 5 wherein said meter is a linear scale device.

7. The circuit as recited in claim 1 wherein said voltage reference sources are diodes coupled for forward conduction in said opposite branches.

8. The circuit as recited in claim 7 wherein said diodes and transistor amplifiers are germanium devices to permit low voltage expanded scale readings.

References Cited

UNITED STATES PATENTS 2,873,428  2/1959  Bruno et al. _____ 324—131
3,079,556  2/1963  Connelly et al. ____ 324—132 X ALFRED E. SMITH, Primary Examiner U.S. Cl. X.R.

307—229